(12) United States Patent
Van Thiel et al.

(10) Patent No.: US 11,858,483 B2
(45) Date of Patent: Jan. 2, 2024

(54) ELECTROPNEUMATIC PARKING BRAKE ARRANGEMENT HAVING A SHUT-OFF VALVE AND METHOD FOR CONTROLLING AN ELECTRONICALLY CONTROLLED PNEUMATIC BRAKE SYSTEM

(71) Applicant: WABCO GmbH, Hannover (DE)

(72) Inventors: Julian Van Thiel, Burgwedel (DE); Robert Otremba, Ronnenberg (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 413 days.

(21) Appl. No.: 17/269,267

(22) PCT Filed: Aug. 14, 2019

(86) PCT No.: PCT/EP2019/071815
§ 371 (c)(1),
(2) Date: Feb. 18, 2021

(87) PCT Pub. No.: WO2020/038798
PCT Pub. Date: Feb. 27, 2020

(65) Prior Publication Data
US 2021/0284115 A1 Sep. 16, 2021

(30) Foreign Application Priority Data
Aug. 21, 2018 (DE) ........................ 10 2018 120 350

(51) Int. Cl.
*B60T 13/38* (2006.01)
*B60T 8/94* (2006.01)
(Continued)

(52) U.S. Cl.
CPC .............. *B60T 13/385* (2013.01); *B60T 8/94* (2013.01); *B60T 13/268* (2013.01); *B60T 13/36* (2013.01);
(Continued)

(58) Field of Classification Search
CPC .......... B60T 13/385; B60T 13/36; B60T 8/94; B60T 17/221; B60T 7/08; B60T 13/268;
(Continued)

(56) References Cited

U.S. PATENT DOCUMENTS

2005/0029859 A1 2/2005 Bensch et al.
2010/0078988 A1* 4/2010 Bensch ................. B60T 13/588
303/3
(Continued)

FOREIGN PATENT DOCUMENTS

CN 101500868 A 8/2009
CN 101622164 A 1/2010
(Continued)

OTHER PUBLICATIONS

Translation of German Patent No. DE 102010054711 obtained from website: https://worldwide.espacenet.com on May 30, 2023.*
(Continued)

*Primary Examiner* — Pamela Rodriguez
(74) *Attorney, Agent, or Firm* — LEYDIG, VOIT & MAYER, LTD.

(57) ABSTRACT

An electro-pneumatic parking brake arrangement includes a shut-off valve and a parking brake module. The parking brake module includes a reservoir connection configured to connect to a compressed air reservoir, a first spring-loaded accumulator connection configured to connect to the shut-off valve, an electro-pneumatic valve unit having at least one electro-pneumatic valve configured to output a spring-loaded brake pressure at the first spring-loaded accumulator connection, and an electronic control unit configured to receive parking brake signals from an electronic parking brake switch and/or a higher-order control unit. The shut-off valve comprises a second spring accumulator connection configured to connect the spring-loaded brakes of the further (Continued)

axle and to shut off the second spring accumulator connection depending on a shut-off signal provided by the parking brake module.

20 Claims, 3 Drawing Sheets

(51) Int. Cl.
*B60T 13/26* (2006.01)
*B60T 13/36* (2006.01)
*B60T 13/68* (2006.01)
*B60T 15/02* (2006.01)
*B60T 17/22* (2006.01)
*B60T 7/08* (2006.01)
*B60T 7/12* (2006.01)
*B60T 8/17* (2006.01)
*B60T 7/00* (2006.01)

(52) U.S. Cl.
CPC .......... *B60T 13/683* (2013.01); *B60T 15/027* (2013.01); *B60T 17/221* (2013.01); *B60T 7/00* (2013.01); *B60T 7/12* (2013.01); *B60T 8/17* (2013.01); *B60T 2270/402* (2013.01); *B60T 2270/413* (2013.01)

(58) Field of Classification Search
CPC ............. B60T 15/027; B60T 2270/402; B60T 2270/413; B60T 13/683
See application file for complete search history.

(56) References Cited

U.S. PATENT DOCUMENTS

| | | | |
|---|---|---|---|
| 2020/0079341 A1 | 3/2020 | Van Thiel | |
| 2020/0189545 A1 | 6/2020 | Bensch et al. | |

FOREIGN PATENT DOCUMENTS

| | | |
|---|---|---|
| CN | 101970270 A | 2/2011 |
| CN | 107921941 A | 4/2018 |
| CN | 108349477 A | 7/2018 |
| DE | 2928982 A1 | 3/1981 |
| DE | 19942533 A1 | 11/2000 |
| DE | 10336611 A1 | 3/2005 |
| DE | 102010054711 A1 | 6/2012 |
| DE | 102017006423 A1 | 3/2018 |
| DE | 102017006356 A1 | 9/2018 |
| DE | 102017007780 A1 | 2/2019 |
| EP | 1538054 A2 | 6/2005 |
| EP | 2239172 A1 | 10/2010 |
| GB | 2061430 B | 6/1983 |

OTHER PUBLICATIONS

Translation of German Patent No. DE 102017006423 obtained from website: https://worldwide.espacenet.com on May 30, 2023.*

* cited by examiner

ELECTROPNEUMATIC PARKING BRAKE ARRANGEMENT HAVING A SHUT-OFF VALVE AND METHOD FOR CONTROLLING AN ELECTRONICALLY CONTROLLED PNEUMATIC BRAKE SYSTEM

CROSS REFERENCE TO RELATED APPLICATIONS

This application is a U.S. National Phase Application under 35 U.S.C. § 371 of International Application No. PCT/EP2019/071815, filed on Aug. 14, 2019, and claims benefit to German Patent Application No. DE 10 2018 120 350.0, filed on Aug. 21, 2018. The International Application was published in German on Feb. 27, 2020 as WO 2020/038798 A1 under PCT Article 21(2).

FIELD

The present disclosure relates to an electro-pneumatic parking brake arrangement for an electronically controlled pneumatic braking system with spring-loaded brakes at a rear axle and at a further axle of a vehicle, in particular a utility vehicle, with a parking brake module, comprising a reservoir connection for the connection of a compressed air reservoir, a first spring-loaded accumulator connection, an electro-pneumatic valve unit with at least one electro-pneumatic valve for modulating a spring-loaded brake pressure at the first spring-loaded accumulator connection, and an electronic control unit for receiving parking brake signals from an electronic parking brake switch and/or a higher-order control unit. The present disclosure further relates to an electronically controlled pneumatic braking system with an electro-pneumatic parking brake arrangement of this type and to a method for controlling such an electronically controlled pneumatic braking system.

BACKGROUND

Spring-loaded brakes can be utilized as parking brakes and comprise a spring-loaded brake actuator, which applies the brake in a pressureless manner, so that, in a pressureless state, the vehicle is appropriately braked. In order to disengage the spring-loaded brakes, they are acted upon by compressed air, so that the spring-loaded brakes are disengaged against the force of the spring.

Generally, such electro-pneumatic parking brake modules therefore comprise a reservoir connection for the connection of a compressed air reservoir, and at least one spring-loaded accumulator connection for the connection of at least one spring-loaded brake cylinder. In this case, it is conceivable, and frequently also implemented, that all spring-loaded brake cylinders of the utility vehicle, in particular of the traction vehicle of a traction vehicle-trailer combination, are connected at a single spring-loaded accumulator connection of the electro-pneumatic parking brake module. It is also possible that separate connections are provided for this purpose.

Such an electro-pneumatic parking brake module of the generic type is disclosed, for example, in DE 103 36 611 A1. The parking brake module disclosed therein comprises a relay valve, which is coupled to a pilot control unit, which connects a control input of the relay valve to the reservoir connection via an electrically switched 2/2-way valve and a bistable 3/2-way valve. The electrically controlled 2/2-way valve is utilized for the pulsed venting of the control input, in order to also utilize the spring-loaded accumulators for the auxiliary brake application or an additional braking. The bistable 3/2-way valve is utilized for maintaining a ventilated or vented state of the control input of a relay valve, in order to maintain the state of the spring-loaded brakes. In the driving operation, a pressure is to be permanently output at the spring-loaded accumulator connection, so that the spring-loaded brake cylinders are disengaged. In the stopped state of the vehicle, however, the spring-loaded brake cylinders are to be applied, i.e., vented.

If spring-loaded brakes are now provided not only at the rear axle, but also at the further axle, for example, front axle, and the spring-loaded brakes of the rear axle as well as of the further axle are to be utilized for auxiliary braking or additional braking, the problem exists that, in particular, an overbraking at the further axle takes place when the spring-loaded brakes at the rear axle are utilized in the case of a fault of the rear axle service brake control.

EP 1 538 054 A1 describes a system, which comprises at least one service brake circuit for at least one of the wheels at at least one wheel axle, wherein the service brake circuit is loadable with the aid of a first fluid pressurized at a first pressure. The system further comprises a parking brake device with at least one parking brake circuit for each of the wheels of the at least one wheel axle, wherein the parking brake circuit is unloadable with the aid of a second fluid, which is pressurized at a second pressure, counter to the restoring force of at least one spring-loaded element, wherein a control means is present for preventing the lockup of at least one of the wheels due to a pressure drop in the parking brake circuit during the driving operation of the motor vehicle. The control means for preventing a lockup state acts upon a change-over valve, of which one input is connected to an output of the control means, which is associated with the service brake circuit on only one side of the vehicle, and of which a further input is connected to the parking brake circuit. The change-over valve is designed in such a way that fluid from a supply line for the service brake circuit is also suppliable to the parking brake circuit when the pressure in the parking brake circuit is lower than the pressure in the service brake circuit. As a result, spring-loaded brakes at a further axle, such as, in particular, a front or supplementary axle, can be prevented from being applied when the parking brake circuit vents the spring-loaded brakes of the rear axle.

Moreover, DE 199 42 533 A1 describes a parking brake device for vehicles, which comprises an actuating element for actuating wheel brake devices. The parking brake device comprises an anti-lock control device, which controls the wheel brake devices depending on the rotational speed, detected by a sensor means, of the wheels to be acted upon by the wheel brake units with a parking brake force in such a way that a lockup of the wheels is prevented. In this system, sensors are therefore utilized, which measure the rotational speed and, on the basis thereof, can detect a lockup of the wheels. It is problematic, however, that such sensors may possibly not be able to be read out any more, depending on the fault that occurs.

SUMMARY

In an embodiment, the present invention provides an electro-pneumatic parking brake arrangement for an electronically controlled pneumatic braking system. The electronically controlled pneumatic braking system includes spring-loaded brakes at a rear axle and a further axle of a vehicle. The electro-pneumatic parking brake arrangement includes a shut-off valve and a parking brake module. The parking brake module includes a reservoir connection configured to connect to a compressed air reservoir, a first spring-loaded accumulator connection configured to connect to the shut-off valve, an electro-pneumatic valve unit having at least one electro-pneumatic valve configured to output a spring-loaded brake pressure at the first spring-loaded accumulator connection, and an electronic control unit configured to receive parking brake signals from an electronic parking brake switch and/or a higher-order control unit. The shut-off valve comprises a second spring accumulator connection configured to connect the spring-loaded brakes of the further axle and to shut off the second spring accumulator connection depending on a shut-off signal provided by the parking brake module.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
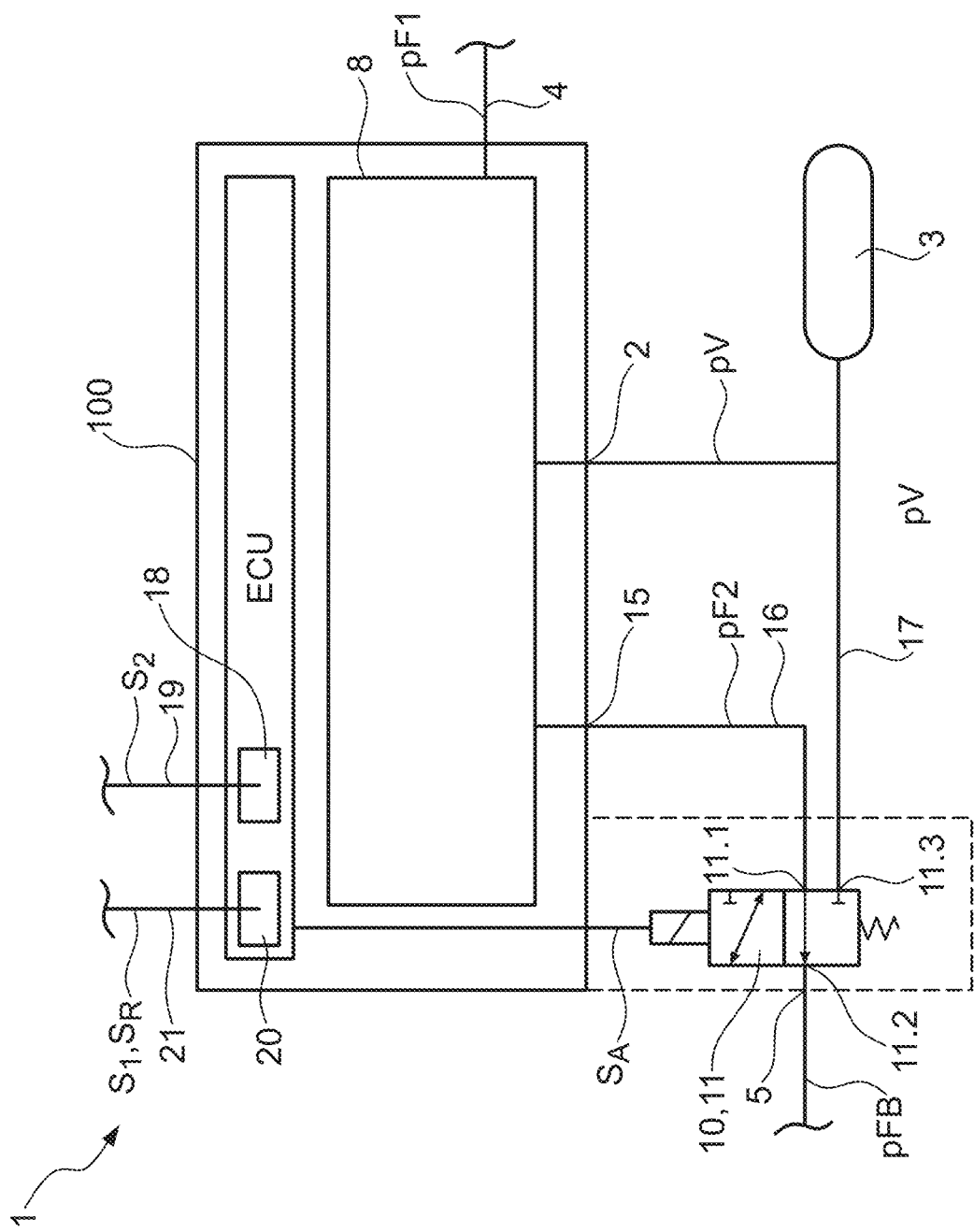
FIG. 1 shows a schematic representation of an electronic parking brake arrangement according to a first exemplary embodiment.

The present disclosure provides an electro-pneumatic parking brake arrangement of the type mentioned at the outset, with the aid of which at least one basic anti-lock function can be implemented, which can continue to ensure the stability of the vehicle in the event of a fault. According to a first aspect, an electro-pneumatic parking brake arrangement of the type mentioned at the outset comprises a shut-off valve, which is connected at the first spring-loaded accumulator connection, and wherein the shut-off valve comprises a second spring-loaded accumulator connection for the connection of the spring-loaded brakes of the at least one further axle and shuts off the second spring-loaded accumulator connection depending on a shut-off signal provided by the parking brake module.

The present disclosure acknowledges that, when not only the rear axle of the vehicle is equipped with spring-loaded brakes, but rather also at least one further axle, such as, in particular, a front axle and/or supplementary axle, the venting of the spring-loaded brakes at this at least one further axle should be avoided for the case in which the spring-loaded brakes of the rear axle are utilized for the supplementary and/or auxiliary braking, but, simultaneously, a redundant activation of service brakes of the front axle, or even a regular activation of service brakes of the further axle takes place. This means, only in the case, in which a rear axle service brake control is faulty and the spring-loaded brakes of the rear axle perform this task redundantly, the spring-loaded brakes of the at least one further axle (front axle and/or supplementary axle) are to remain vented, in order to prevent them from being applied. The shut-off valve is provided for this purpose, which, in this case, shuts off the second spring-loaded accumulator connection based on a shut-off signal provided by the parking brake module, so that the second spring-loaded accumulator connection can no longer be vented via the parking brake module. As a result, the stability of the vehicle can be increased.

The further axle is preferably a front axle and/or supplementary axle. Spring-loaded brakes can be provided, in particular, with respect to such axles, and their engagement, i.e., venting, can result in the lockup of the axle and, therefore, the instability of the vehicle in certain situations.

In a first embodiment, it is provided that the spring-loaded brakes of the rear axle are also connectable at the first spring-loaded accumulator connection. In practical application, parking brake modules are utilized that have a single spring-loaded accumulator connection, at which a T-piece is then connected, of which a first outlet is utilized for the rear axle and the second outlet is utilized for a further axle. A first connector of the T-piece is then connected to the first spring-loaded accumulator connection, a second connector of the T-piece is connected to the shut-off valve, and a third connector of the T-piece forms a third spring-loaded accumulator connection for spring-loaded brakes of the rear axle.

It can also be provided, however, that the parking brake module itself comprises two connections, namely the first spring-loaded accumulator connection and a separate rear axle connection for the spring-loaded brakes of the rear axle. In this case, two different spring-loaded brake pressures can also be output, namely a first spring-loaded brake pressure and a second spring-loaded brake pressure. The first spring-loaded brake pressure and the second spring-loaded brake pressure are preferably identical. Depending on the design of the parking brake module, it can also be provided that the first spring-loaded brake pressure and the second spring-loaded brake pressure are different or even independent of one another.

In one preferred embodiment, the shut-off valve is electromagnetically switchable and the shut-off signal is an electronic signal provided by the electronic control unit. In certain embodiments, it can also be provided that the shut-off signal is a pneumatic signal; preferably, this is an electronic signal, however. The electronic control unit of the electro-pneumatic parking brake arrangement can be integrated with the parking brake module and, in particular, can be the electronic control unit of the parking brake module. Preferably, the electronic control unit is coupled via a vehicle bus or an alternative communication interface to a central module or the like, so that the electronic control unit is also provided for receiving signals that represent, for example, a fault in the rear axle service brake control. Based thereon, the electronic control unit can then provide the shut-off signal.

Preferably, the shut-off valve comprises a first switch position, in which the spring-loaded brake pressure is passable through to the spring-loaded brakes of the further axle, and a second switch position, in which the spring-loaded brakes of the further axle remain ventilated regardless of the spring-loaded brake pressure. In this case, the spring-loaded brake pressure is not transferred to the spring-loaded brakes of the at least one further axle, and the spring-loaded brakes of the further axle remain ventilated regardless of the spring-loaded brake pressure. An application of the spring-loaded brakes of the at least one further axle is prevented. In one variant, it is preferably provided that the shut-off valve is designed for outputting, in the second switch position, a supply pressure at the spring-loaded brakes of the further axle. As a result, it can be ensured that the spring-loaded brakes of the further axle remain disengaged, i.e., ventilated.

In this case, the shut-off valve is preferably designed as a 3/2-way valve. It preferably comprises a first 3/2-way valve connection connected to the first spring-loaded accumulator connection, a second 3/2-way valve connection forming the second spring-loaded accumulator connection or connected thereto, and a third 3/2-way valve connection connected or connectable to the or a compressed air reservoir. In a first switch position, the first 3/2-way valve connection is preferably connected to the second 3/2-way valve connection and, in the second switch position, the second 3/2-way valve connection is connected to the third 3/2-way valve connection. In the first switch position, consequently, the spring-loaded brake pressure is output at the second spring-loaded accumulator connection, while, in the second switch position, the supply pressure of the or a compressed air reservoir is output at the second spring-loaded accumulator connection.

It can be provided that the 3/2-way valve is integrated with the parking brake module, in particular into a common housing. Likewise, however, it can also be arranged separately therefrom and, in particular, at a distance therefrom. One variant or the other has advantages depending on the configuration of the overall braking system.

In a further variant, it is provided that this shut-off valve is provided for confining, in the second switch position, a pressure of the spring-loaded brakes of the further axle. In this case, no supply pressure is additionally output at the spring-loaded brakes of the at least one further axle, but rather the pressure of the spring-loaded brakes that is already present and is applied there is merely confined and, in this way, a venting of the spring-loaded brakes is prevented. This variant is structurally simpler, but has the disadvantage that it is not possible to supply additional air in order to continue ventilating the spring-loaded brakes of the further axle.

In this case, the shut-off valve is preferably designed as a 2/2-way valve. It preferably comprises a first 2/2-way valve connection connected to the shut-off valve connection and a second 2/2-way valve connection forming the second spring-loaded accumulator connection, wherein, in the first switch position, the first 2/2-way valve connection is connected to the second 2/2-way valve connection and, in the second switch position, the first 2/2-way valve connection and the second 2/2-way valve connection are separated from each other.

In the non-energized condition, the 3/2-way valve as well as the 2/2-way valve are preferably in their first switch positions, so that the spring-loaded brake pressure is outputtable at the second spring-loaded accumulator connection in the non-energized condition in each case. The safety can be further increased as a result.

In a further preferred embodiment, the electronic control unit is designed for receiving a parking brake signal for the redundant control of the rear axle and the further axle and, in this case, providing the shut-off signal at the shut-off valve. The electronic control unit receives the parking brake signal preferably via a vehicle bus, and/or via a direct line between the electronic control unit and a further electronic control unit of a further module, such as, in particular, a central module, a module for autonomous driving, or an axle modulator of the rear axle.

It is further preferred that the electronic control unit is designed for not outputting the shut-off signal when a parking brake signal of the electronic parking brake switch for engaging the parking brakes is received. In this case, regardless of whether a rear axle service brake control is faulty or not, the vehicle is to be stopped and parked, and so the engagement of the parking brakes, i.e., the venting of the spring-loaded brake cylinders, of the rear axle as well as of the at least one further axle, is preferred. For this reason, it is preferred that the output of the shut-off signal by the electronic control unit is prevented when the vehicle driver actuates the parking brake switch.

Moreover, the electronic control unit is preferably designed for providing the shut-off signal at the shut-off valve when a parking brake signal of the electronic parking brake switch for disengaging the parking brakes is received. This variant is preferably provided for the case in which the shut-off valve is designed for outputting, in the second switch position, a supply pressure at the spring-loaded brakes of the further axle. In this way, upon the disengagement of the parking brakes with the aid of the electronic parking brake switch, additionally, supply pressure can be output directly at the spring-loaded brakes of the at least one further axle, bypassing the parking brake module, only via the shut-off valve, in order to accelerate the disengagement of the spring-loaded brakes of the further axle. As a result, the disengagement process can be accelerated overall.

In one variant, the shut-off valve is flange-mounted onto a housing of the electro-pneumatic parking brake module. Via the flange connection, the appropriate connectors can be directly connected and a structurally-optimized design can be achieved.

In a second aspect, an electronically controlled pneumatic braking system is provided for a vehicle, in particular a utility vehicle, with a central module for controlling the braking system, comprising a rear axle service brake control, with at least one first brake circuit and a parking brake circuit, first spring-loaded brakes for a rear axle, second spring-loaded brakes for at least one further axle, and an electro-pneumatic parking brake arrangement according to one of the above-described, preferred embodiments of an electro-pneumatic parking brake arrangement according to the first aspect, wherein the electro-pneumatic parking brake module is designed for providing the shut-off signal when, in the event of a fault of the rear axle service brake control, a control of the further axle is carried out with the aid of a normal operation of a further axle modulator or of a pneumatic redundancy mode of the further axle modulator or an electro-pneumatic redundancy module. The central module of the braking system is provided for controlling the usual operation of the braking system, which comprises, in particular, a rear axle service brake control. A rear axle service brake control is a control of the service brakes of the rear axles, which are provided based on signals of the central module, which are derived, for example, from a brake pedal, or from signals of a unit for autonomous driving. When, in the event of a fault of the rear axle service brake control, this no longer functions properly, the rear axle service brake control is usually performed, for example, by a normal operation of a further axle modulator of the further axle, such as, in particular, a front axle modulator or a supplementary axle modulator. Depending on the fault, the rear axle service brake control can also be carried out by a pneumatic redundancy mode of the further axle modulator (front axle modulator and/or supplementary axle modulator) or by a separately provided electro-pneumatic redundancy module. The control of the further axle is preferably redundant in this case. For the purpose of redundant control, the braking system can also comprise an electro-pneumatic redundancy module for the further axle for the redundant modulation of service brakes of the further axle. As soon as the rear axle service brake control is taken over by one of these further elements, the shut-off signal is preferably provided, in order to avoid an unintended venting of spring-loaded brakes of the further axle.

It is to be understood that the electro-pneumatic parking brake arrangement according to the first aspect, as well as the electronically controlled pneumatic braking system according to the second aspect have identical and similar aspects, of the type described. Reference is made to the description, above, of the first aspect for further features and their advantages.

In a third aspect, the present disclosure provides a method for controlling an electronically controlled pneumatic braking system according to the second aspect, including the steps of: receiving a redundant parking brake signal at the electronic control unit, wherein the redundant parking brake signal displays or requests that a redundant control of service brakes of the further axle be carried out, and providing the shut-off signal at the shut-off valve.

The method further preferably comprises the steps: receiving a parking brake signal from an electronic parking brake switch for disengaging spring-loaded brakes; and providing the shut-off signal at the shut-off valve for outputting the supply pressure at the second spring-loaded accumulator connection. In this way, a disengagement of spring-loaded brakes of the further axle can be accelerated.

The arrangement described herein, the braking system, and the method are suited, in particular, for higher degrees of automation (levels 2-5) or as an alternative redundancy concept in a 2e braking system (2e-BST).

Embodiments are now described in the following with reference to the drawings. It is not intended for the embodiments to necessarily be depicted literally; instead, the drawings are presented in a schematicized and/or slightly distorted form as necessary for purposes of explanation. Reference is made to the relevant prior art in regard to supplements to teachings that are not immediately clear from the drawings. It should be noted that various modifications and changes related to the form and detail of an embodiment can be made without deviating from the general idea of the disclosure. All combinations of at least two of the features disclosed in the description, the drawings, and/or claims also fall within the scope of the present disclosure. The general idea of the present disclosure is not limited to the exact form or the detail of the preferred embodiments shown and described in the following, nor is it limited to a subject matter that would be limited compared to the subject matter claimed in the claims. In the case of measurement ranges that are indicated, values located within the stated limits are also intended to be disclosed, and they can be applied and claimed arbitrarily. For the sake of simplicity, the same reference signs are used in the following for identical or similar parts or parts having an identical or similar function.

An electro-pneumatic parking brake arrangement 1 comprises a reservoir connection 2 for the connection of a compressed air reservoir 3, a first spring-loaded accumulator connection 4 and a second spring-loaded accumulator connection 5. Specifically, the reservoir connection 2 and the first spring-loaded accumulator connection 4 are formed at a parking brake module 100, which is part of the electro-pneumatic parking brake arrangement 1.

The parking brake module 100 can be designed in a conventional way, in particular as described in DE 103 36 611 A1, DE 10 2017 002 715 A1, DE 10 2017 006 356 A1, or in DE 10 2017 007 780 A1. The parking brake module 100 is designed in a known way and comprises an electronic control unit ECU as well as an electro-pneumatic valve unit 8. The electro-pneumatic valve unit 8 comprises at least one electronically switchable solenoid valve (not shown) and receives switch signals from the electronic control unit ECU, which trigger the electro-pneumatic valve unit 8 to appropriately provide, from the supply pressure pV, which is made available at the reservoir connection 2, a spring-loaded brake pressure pF at the first spring-loaded accumulator connection 4.

In the embodiments shown here, the parking brake module 100 comprises only one single spring-loaded accumulator connection 4, at which a T-piece 14 is then connected. The first T-piece connector 14.1 is connected to the first spring-loaded accumulator connection 4, the second T-piece connector 14.2 is connected to the shut-off valve 10, and the third T-piece connector 14.3 forms a third spring-loaded accumulator connection 15, at which the spring-loaded brakes 6 of the rear axle HA can then be connected.

The electro-pneumatic parking brake arrangement 1 comprises a shut-off valve 10, which is connected to the first spring-loaded accumulator connection 4. Specifically, the shut-off valve 10 in the embodiment shown in FIG. 1 is connected to the first spring-loaded accumulator connection 4 via the T-piece 14. The shut-off valve 10 receives the spring-loaded brake pressure pF and provides a regulated spring-loaded brake pressure pFB for the slip control of the wheels of an axle at a second spring-loaded accumulator connection 5, which is intended to be connected to spring-loaded brakes 7 of a further axle VA, ZA. In particular, the shut-off valve 10 can directly form the second spring-loaded accumulator connection 5.

In the embodiment shown in FIG. 1, the shut-off valve 10 is designed as a 3/2-way valve 11. It comprises a first 3/2-way valve connection 11.1, a second 3/2-way valve connection 11.2, and a third 3/2-way valve connection 11.3. In a first switch position shown in FIG. 1, the first 3/2-way valve connection 11.1 is connected to the second 3/2-way valve connection 11.2. In a second switch position (not shown in FIG. 1), the third 3/2-way valve connection 11.3 is connected to the second 3/2-way valve connection 11.2. The 3/2-way valve 11 is preloaded, in a non-energized state, into the first switch position. The first 3/2-way valve connection 11.1 is connected via a first pneumatic line 16 to the first spring-loaded accumulator connection 4, so that the spring-loaded brake pressure pF is present at the first spring-loaded accumulator connection 4. The second 3/2-way valve connection 11.2 is connected to or forms the second spring-loaded accumulator connection 5. The third 3/2-way valve connection 11.3 is connected via a second pneumatic line 17 to a compressed air reservoir 3, so that the supply pressure pV is present at the third 3/2-way valve connection 11.3. This means, in the first switch position, the spring-loaded brake pressure pF is passed through by the shut-off valve 10 and, in the second switch position, the supply pressure pV is present at the second spring-loaded accumulator connection 5.

Moreover, the electronic control unit ECU comprises a first electrical connector 18 and a second electrical connector 20. The first electrical connector 18 is connected to a first electrical line 19, which can be designed, for example, as a BUS. The second electrical connector 20 is connected to a second electrical line 21, which can also be designed as a BUS, for example, as a vehicle BUS. Via the first electrical line 19, the electronic control unit ECU receives a first parking brake signal 51, which is provided by a central unit or a unit for autonomous driving. Via the second electrical line 21, the electronic control unit ECU receives a redundant parking brake signal SR, which indicates that a rear axle service brake control is not functioning or is not functioning properly, and a redundant control of the rear axle HA is carried out. Moreover, the electronic control unit ECU receives a second parking brake signal S2 via the second electrical line 21, which is manually triggered by an electronic parking brake switch HCU.

While the first parking brake signal 51 and the second parking brake signal S2 are utilized for the normal operation of the parking brake module 100 in order to output, or vent, the spring-loaded brake pressure pF in order to engage the parking brakes 6, 7 (FIGS. 2, 3), a shut-off signal SA is output by the electronic control unit ECU based on the reception of the redundant parking brake signal SR. This shut-off signal SA is provided at the shut-off valve 10, which then switches from the first switch position shown in FIG. 1 into the second switch position (not shown in FIG. 1) in order to output the supply pressure pV at the second spring-loaded accumulator connection 5.

The shut-off valve 10 is represented in FIG. 1 enclosed with a dashed line. In this way, it is to be indicated that the shut-off valve 10 can also be integrated into the parking brake module 100. In this case, the second spring-loaded accumulator connection 5 would be an interface of the parking brake module 100. In one variant, the shut-off valve 10 can also be flange-mounted onto a housing of the parking brake module 100, or provided at a distance therefrom.

Figure 2:
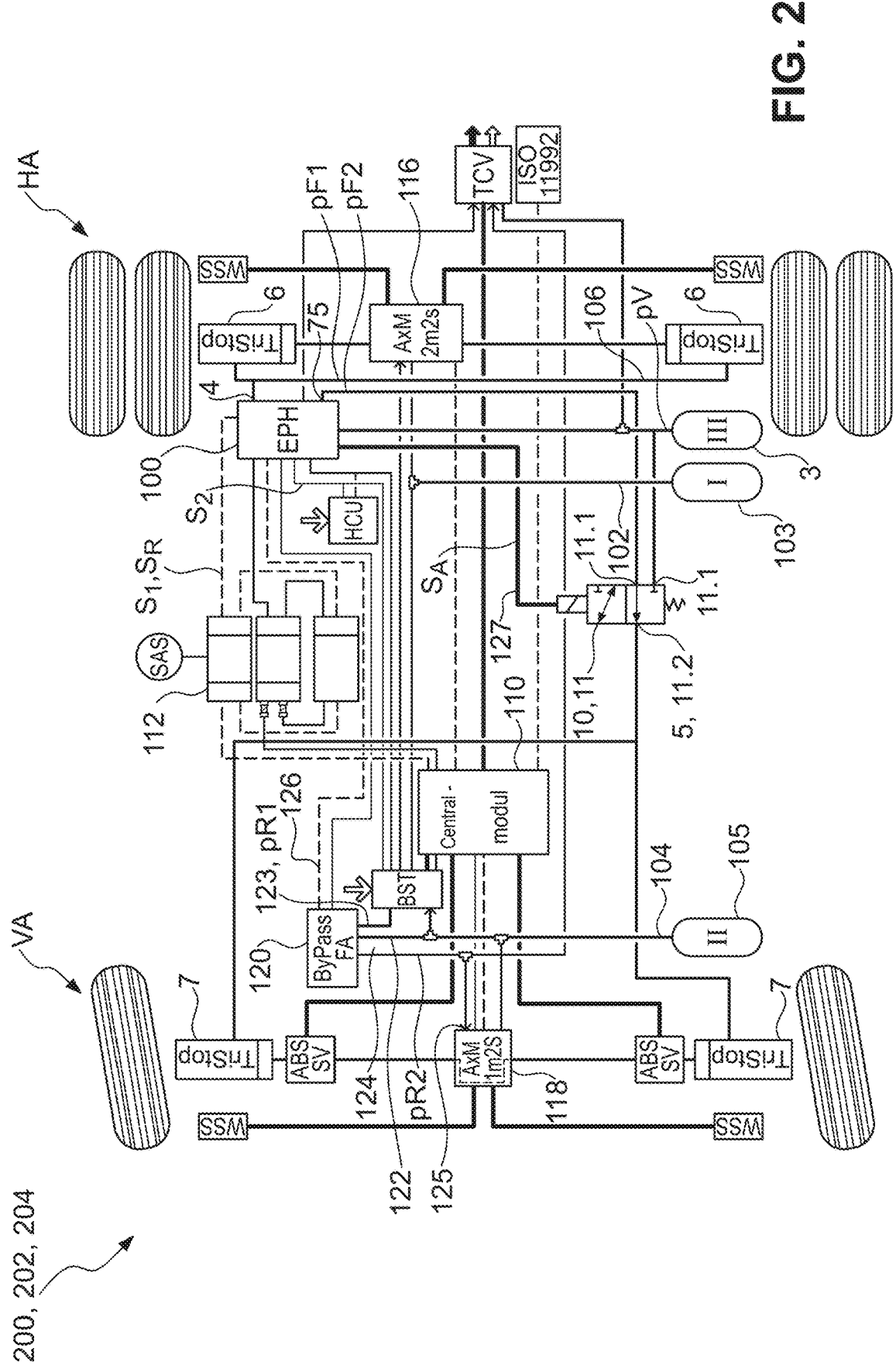
FIG. 2 shows a schematic representation of an electronically controlled pneumatic braking system with an electro-pneumatic parking brake arrangement according to the first exemplary embodiment.
Figure 3:
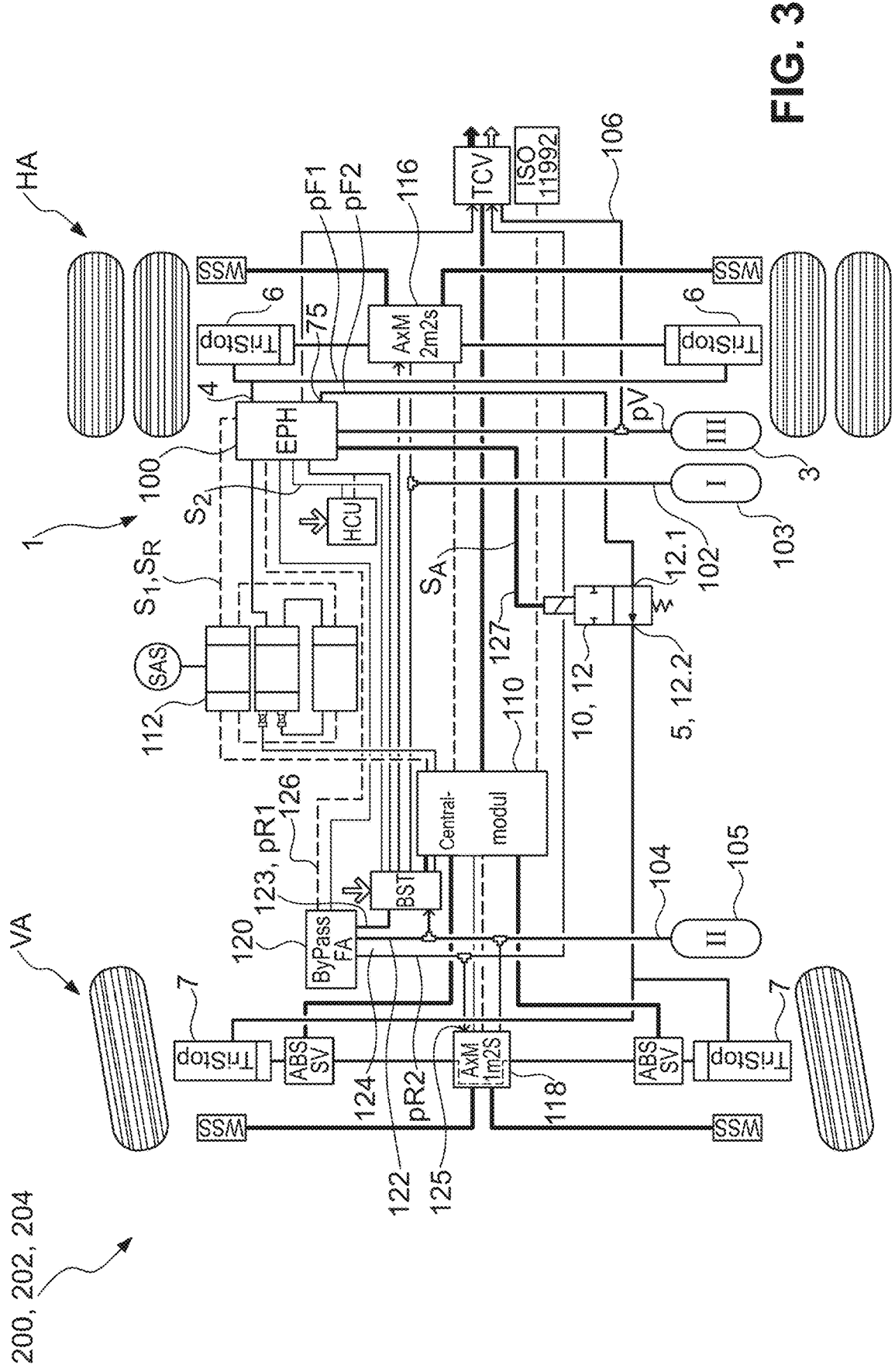
FIG. 3 shows an electronically controlled pneumatic braking system with an electro-pneumatic parking brake arrangement according to a second exemplary embodiment.

FIGS. 2 and 3 now show two different embodiments of an electronically controlled pneumatic braking system 200 of a vehicle 202, namely a utility vehicle 204. The utility vehicle 204 comprises a rear axle HA and a front axle VA, which forms a further axle in this exemplary embodiment. Likewise, the further axle can be formed as a supplementary axle ZA, which is not shown in this exemplary embodiment, however.

The braking system 200 initially comprises, in addition to the parking brake module 100, first spring-loaded brakes 6 for the rear axle HA and second spring-loaded brakes 7 for the front axle VA. The first spring-loaded brakes 6 as well as the second spring-loaded brakes 7 are provided in so-called triple-acting brake cylinders, which can also act as service brakes. The service-brake portion of the first spring-loaded brakes 6 is supplied by a first brake circuit 102, which is connected to a compressed air reservoir 103. The service-brake portions of the second spring-loaded brakes 7 in the front axle VA are supplied by a second brake circuit 104, which is connected to a second compressed air reservoir 105. The parking brake circuit 106, which is also connected to the parking brake module 100, is supplied by the compressed air reservoir 3, i.e., the third compressed air reservoir 3 in this case.

In order to control the braking system 200, a central module 110 is provided, which is connected to a vehicle BUS 112. Via the vehicle BUS 112, information and data are exchanged, in particular such information and data that originate from a unit for autonomous driving 114 and, in particular, trigger signals for the service brakes. The parking brake module 100 is also connected to the vehicle BUS 112 and receives, for example, the redundant parking brake signal SR via the vehicle BUS 112.

A rear axle modulator 116 is provided for modulating the service brake pressure at the rear axle HA and a front axle modulator 118 is provided for modulating the service brake pressure at the front axle VA. These are each connected to the central module 110 and are supplied with pneumatic pressure from the first compressed air reservoir 103 or the second compressed air reservoir 105, respectively. In a known way, these control the output of appropriate wheel brake pressures at the service brakes of the appropriate front axle VA or rear axle HA based on the reception of appropriate signals from the central module 110.

The output of service brake pressures can take place via a brake pedal BST, which, in this exemplary embodiment, operates electrically and is connected to the central module 110. Moreover, the braking system 200 comprises an electronic parking brake switch HCU, which is connected to the parking brake module 100 via electrical lines and provides the second parking brake signal S2 at the parking brake module 100. For a redundancy modulation of the front axle brake pressure, the braking system 200 in this exemplary embodiment comprises an electro-pneumatic redundancy module 120. This redundancy module 120 receives supply pressure pV from the second compressed air reservoir 105 via a third pneumatic line 122. Via a pneumatic redundancy control line 123, the redundancy module 120 is connected to the brake pedal BST and, from this, receives a redundant brake pressure PR. Based thereon, the redundancy module 120 provides an appropriate redundant brake control pressure pR2 via a fourth pneumatic line 124 at the front axle modulator 118, namely at a redundancy pressure connection 125 thereof. Based on this received redundant control pressure pR2, the front axle modulator 118 can output a front axle brake pressure at service brakes of the front axle VA. Simultaneously, the redundancy module 120 provides appropriate signals at the parking brake module 100 via third electrical lines 126, which, based thereon, decreases the spring-loaded brake pressure pF in order to redundantly brake the rear axle HA with the aid of the parking brakes 6 of the rear axle HA. Since the front axle VA also comprises spring-loaded brakes 7, however, these would also be braked when the spring-loaded brake pressure pF decreases.

For this purpose, as described above, the shut-off valve 10 is provided, which is connected between the parking brake module 100 and the spring-loaded brakes 7 of the front axle VA. In the case of redundancy, the shut-off valve 10 receives the shut-off signal SA from the parking brake module 100 via an electrical shut-off valve line 126, so that the shut-off valve 10 switches. In the exemplary embodiment shown in FIG. 2, the shut-off valve 10 is once again designed as a 3/2-way valve 11, so that, upon reception of the shut-off signal SA, the supply pressure pV of the third compressed air reservoir 3 is provided at the spring-loaded brakes 7 of the front axle VA.

Simultaneously, however, the shut-off signal SA can also be provided for the case in which the utility vehicle 204 is to be released from a stopped and parked state, in which the spring-loaded brakes 6, 7 are engaged. In this case, the spring-loaded brakes 6, 7 must be ventilated. If, in the exemplary embodiment shown in FIG. 2, the shut-off signal SA is then provided, the shut-off valve 10 switches into the second switch position (not shown in FIG. 2) and the spring-loaded brakes 7 of the front axle VA are ventilated directly from the third compressed air reservoir 3. As a result, the spring-loaded brakes 7 of the front axle VA can be disengaged more quickly.

In contrast to the first exemplary embodiment (FIG. 1), a separate third spring-loaded accumulator connection 15 for the rear axle HA is provided in this case. The parking brake module 100 therefore comprises two spring-loaded accumulator connections, namely, on the one hand, the first spring-loaded accumulator connection 4, at which the shut-off valve 10 is connected, and the third spring-loaded accumulator connection 15, at which the spring-loaded brakes 6 of the rear axle HA are directly connected. The T-piece 14 can be omitted in this way.

The exemplary embodiment shown in FIG. 3 is based, in principle, on the braking system shown in FIG. 2, wherein identical and similar elements are provided with identical reference signs. In the following, in particular, the differences from the first exemplary embodiment (FIGS. 1, 2) are described.

In contrast to the first exemplary embodiment, the shut-off valve 10 is designed as a 2/2-way valve 12. It comprises a first 2/2-way valve connection 12.1 and a second 2/2-way valve connection 12.2. In this case, the second 2/2-way valve connection 12.2 forms the second spring-loaded accumulator connection 5. As is also the case in the first exemplary embodiment, the 2/2-way valve 12 also receives the shut-off signal SA from the parking brake module 100, in order to switch from the first switch position shown in FIG. 3 into the second switch position (not shown in FIG. 3). In the second switch position (not shown in FIG. 3), the first 2/2-way valve connection 12.1 and the second 2/2-way valve connection 12.2 are separated, so that the pressure present in the spring-loaded brakes 7 of the front axle VA is confined, and the spring-loaded brakes 7 of the front axle VA remain disengaged.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 electro-pneumatic parking brake arrangement
2 reservoir connection
3 compressed air reservoir
4 first spring-loaded accumulator connection
5 second spring-loaded accumulator connection
6 first spring-loaded brakes
7 second spring-loaded brakes
8 electro-pneumatic valve unit
10 shut-off valve
11 3/2-way valve
11.1 first 3/2-way valve connection
11.2 second 3/2-way valve connection
11.3 third 3/2-way valve connection
14 T-piece
14.1 first T-piece connector
14.2 second T-piece connector
14.3 third T-piece connector
15 third spring-loaded accumulator connection
16 first pneumatic line
17 second pneumatic line
18 first electrical connection
19 first electrical line
20 second electrical connection
21 second electrical line
100 parking brake module
102 first brake circuit
103 first compressed air reservoir
104 second brake circuit
105 second compressed air reservoir
106 parking brake circuit
110 central module
112 vehicle BUS
114 unit for autonomous driving
116 rear axle modulator
118 front axle modulator
120 electro-pneumatic redundancy module
122 third pneumatic line
123 pneumatic redundancy line
124 fourth pneumatic line
125 redundancy connection of 118
126 third electrical lines
127 electrical shut-off valve line
200 electronically controlled pneumatic braking system
202 Vehicle
204 utility vehicle
ECU electronic control unit
pF spring-loaded brake pressure
pFB anti-lock-ensured spring-loaded brake pressure
pV supply pressure
VA front axle
HA rear axle
BST brake pedal
HCU electric parking brake switch

The invention claimed is:

1. An electro-pneumatic parking brake arrangement for an electronically controlled pneumatic braking system, the electronically controlled pneumatic braking system having spring-loaded brakes at a rear axle and a further axle of a vehicle, the electro-pneumatic parking brake arrangement comprising:
   a shut-off valve; and
   a parking brake module comprising:
      a reservoir connection configured to connect to a compressed air reservoir,
      a first spring-loaded accumulator connection configured to connect to the shut-off valve,
      an electro-pneumatic valve unit having at least one electro-pneumatic valve configured to output a spring-loaded brake pressure at the first spring-loaded accumulator connection, and
      an electronic control unit configured to receive parking brake signals from an electronic parking brake switch and/or a higher-order control unit,
   wherein the shut-off valve comprises a second spring accumulator connection configured to connect the spring-loaded brakes of the further axle and to shut off the second spring accumulator connection depending on a shut-off signal provided by the parking brake module, wherein the electronic control unit is configured to receive a redundant parking brake signal for redundant control of the rear axle and the further axle and, to provide the shut-off signal at the shut-off valve, and wherein the redundant parking brake signal is configured to display or request that a redundant control of service brakes of the further axle be carried out.

2. The electro-pneumatic parking brake arrangement as claimed in claim 1, wherein the spring-loaded brakes of the rear axle are configured to be connected at the first spring-loaded accumulator connection.

3. The electro-pneumatic parking brake arrangement as claimed in claim 1, the parking brake module further comprising a separate rear axle connection for spring-loaded brakes of the rear axle.

4. The electro-pneumatic parking brake arrangement as claimed in claim 1, wherein the shut-off valve is electro-magnetically switchable, and wherein the shut-off signal is an electronic signal provided by the electronic control unit.

5. The electro-pneumatic parking brake arrangement as claimed in claim 1, wherein the shut-off valve has a first switch position, in which the spring-loaded brake pressure is configured to be passed through to the spring-loaded brakes of the further axle, and a second switch position, in which the spring-loaded brakes of the further axle remain ventilated regardless of the spring-loaded brake pressure.

6. The electro-pneumatic parking brake arrangement as claimed in claim 5, wherein the shut-off valve is configured to output, in the second switch position, a supply pressure at the spring-loaded brakes of the further axle.

7. The electro-pneumatic parking brake arrangement as claimed in claim 6, wherein the shut-off valve is a 3/2-way valve.

8. The electro-pneumatic parking brake arrangement as claimed in claim 7, wherein the shut-off valve comprises:
a first 3/2-way valve connection connected to the first spring-loaded accumulator connection,
a second 3/2-way valve connection forming or connected to the second spring accumulator connection, and
a third 3/2-way valve connection connected or connectable to the or a compressed air reservoir, and
wherein, in the first switch position, the first 3/2-way valve connection is connected to the second 3/2-way valve connection and, in the second switch position, the second 3/2-way valve connection is connected to the third 3/2-way valve connection.

9. The electro-pneumatic parking brake arrangement as claimed in claim 6, wherein the electronic control unit is configured to provide the shut-off signal at the shut-off valve when a parking brake signal of the electronic parking brake switch for disengaging the parking brakes is received.

10. The electro-pneumatic parking brake arrangement as claimed in claim 5, wherein the shut-off valve is configured to confine, in the second switch position, a pressure of the spring-loaded brakes of the further axle.

11. The electro-pneumatic parking brake arrangement as claimed in claim 10, wherein the shut-off valve is a 2/2-way valve.

12. The electro-pneumatic parking brake arrangement as claimed in claim 11, wherein the shut-off valve comprises a first 2/2-way valve connection connected to the first spring-loaded accumulator connection, and a second 2/2-way valve connection forming or connected to the second spring accumulator connection, and wherein, in the first switch position, the first 2/2-way valve connection is connected to the second 2/2-way valve connection and, in the second switch position, the first 2/2-way valve connection and the second 2/2-way valve connection are separated.

13. The electro-pneumatic parking brake arrangement as claimed in claim 1 wherein the electronic control unit is configured to not output the shut-off signal when a parking brake signal of the electronic parking brake switch for engaging the parking brakes is received.

14. The electro-pneumatic parking brake arrangement as claimed in claim 1, wherein the shut-off valve is integrated into the electro-pneumatic parking brake module.

15. The electro-pneumatic parking brake arrangement as claimed in claim 1, wherein the shut-off valve is flange-mounted onto a housing of the electro-pneumatic parking brake module.

16. The electro-pneumatic parking brake arrangement as claimed in claim 1, wherein the shut-off valve is installed separately and at a distance from the electro-pneumatic parking brake module.

17. An electronically controlled pneumatic braking system for a vehicle, comprising:
a central module configured to control the braking system, comprising a rear axle service brake control,
at least one first brake circuit and a parking brake circuit,
first spring-loaded brakes for a rear axle,
second spring-loaded brakes for a further axle, and
an electro-pneumatic parking brake arrangement as claimed in claim 1,
wherein the electro-pneumatic parking brake module is configured to provide the shut-off signal when, in the event of a fault of the rear axle service brake control, a control of the further axle is carried out with the aid of a normal operation of a further axle modulator or of a pneumatic redundancy mode of the further axle modulator or an electro-pneumatic redundancy module.

18. A method for controlling an electronically controlled pneumatic braking system as claimed in claim 17, the method comprising:
receiving the redundant parking brake signal at the electronic control unit, wherein the redundant parking brake signal displays or requests that a redundant control of service brakes of the further axle be carried out, and
providing the shut-off signal at the shut-off valve.

19. The method as claimed in claim 18, further comprising:
receiving a parking brake signal from an electronic parking brake switch for disengaging the spring-loaded brakes; and
providing the shut-off signal at the shut-off valve for outputting the supply pressure at the second spring accumulator connection.

20. An electro-pneumatic parking brake arrangement for an electronically controlled pneumatic braking system, the electronically controlled pneumatic braking system having spring-loaded brakes at a rear axle and a further axle of a vehicle, the electro-pneumatic parking brake arrangement comprising:
a shut-off valve; and
a parking brake module comprising:
a reservoir connection configured to connect to a compressed air reservoir,
a first spring-loaded accumulator connection configured to connect to the shut-off valve, an electro-pneumatic valve unit having at least one electro-pneumatic valve configured to output a spring-loaded brake pressure at the first spring-loaded accumulator connection, and an electronic control unit configured to receive parking brake signals from an electronic parking brake switch and/or a higher-order control unit, wherein the shut-off valve comprises a second spring accumulator connection configured to connect the spring-loaded brakes of the further axle and to shut off the second spring accumulator connection depending on a shut-off signal provided by the parking brake module, wherein the shut-off valve has a first switch position, in which the spring-loaded brake pressure is configured to be passed through to the spring-loaded brakes of the further axle, and a second switch position, in which the spring-loaded brakes of the further axle remain ventilated regardless of the spring-loaded brake pressure, wherein the shut-off valve is configured to output, in the second switch position, a supply pressure at the spring-loaded brakes of the further axle, and wherein the electronic control unit is configured to provide the shut-off signal at the shut-off valve when a parking brake signal of the electronic parking brake switch for disengaging the parking brakes is received.

* * * * *